Figure 1:
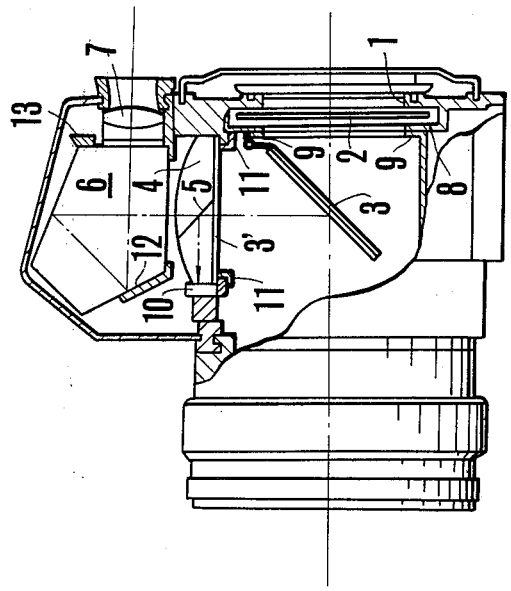

United States Patent [19]
Kakunodate et al.

[11] 3,973,266
[45] Aug. 3, 1976

[54] LIGHT MEASURING SYSTEM OF CAMERA

[75] Inventors: Masamichi Kakunodate, Tokyo; Soichi Nakamoto, Machida, both of Japan

[73] Assignee: Canon Kabushiki Kaisha, Tokyo, Japan

[22] Filed: May 10, 1974

[21] Appl. No.: 468,983

[30] Foreign Application Priority Data
May 15, 1973 Japan.............................. 48-53900

[52] U.S. Cl.................................. 354/31; 354/36; 354/43; 354/51; 354/60 R; 356/222; 356/226; 356/227
[51] Int. Cl.² ........................ G03B 7/08; G01J 1/46
[58] Field of Search .................. 354/23, 29, 30, 31, 354/36, 43, 48, 50, 51, 60 R; 356/218, 226, 227, 222

[56] References Cited
UNITED STATES PATENTS

| | | | |
|---|---|---|---|
| 3,232,192 | 2/1966 | Stimson ................................ | 354/31 |
| 3,633,473 | 1/1972 | Yashuhiro............................. | 354/31 |
| 3,713,371 | 1/1973 | Kurihara et al....................... | 354/31 |
| 3,717,077 | 2/1973 | Harvey.................................. | 354/31 |
| 3,741,088 | 6/1973 | Nobusawa............................. | 354/31 |
| 3,772,517 | 11/1973 | Smith................................... | 354/31 X |

*Primary Examiner*—Joseph F. Peters, Jr.
*Attorney, Agent, or Firm*—Toren, McGeady and Stanger

[57] ABSTRACT

A camera shutter control device includes
a light intensity to electric signal conversion means, which means further includes a first photosensitive means and a second and a third photosensitive means. The first means and the second and third means are designed in such a manner that they receive the light beams coming from a substantially different part of the object to be photographed and give electrical signals corresponding to the light quantity received.
A memory means is included, which is electrically connected with the first and second conversion means and serves to memorize the difference between the signal outputs of both conversion means.
An operation means, the inputs of which are connected with said memory means and the third conversion means so as to give the difference between the outputs of both means as the operation output, and
a control means, which is connected with the operation means so as to control the time for opening the shutter in accordance with the output of the operation means are also included.

19 Claims, 4 Drawing Figures

LIGHT MEASURING SYSTEM OF CAMERA

DETAILED EXPLANATION OF THE INVENTION

The present invention relates to a light measuring system, particularly capable of carrying out a highly precision light measurement of an object having brightness of a wide range.

Until now, the light beam of the object to be photographed is usually received by a light measuring member such as a photoconductive cell or a photo voltaic cell in such a manner that the brightness of the object is converted into an electrical signal so as to be used as the brightness information for an indicator or time circuit. However if the brightness of the object varies over a wide range, the output itself of the light measuring member does not respond to the brightness of the object correctly. The amplifier for processing the output of the light receiving member electrically must unavoidably be of large dynamic range whereby it becomes expensive. Further, construction becomes unavoidably complicated so that high precision light measurement of the object with brightness over a wide range cannot be expected. The above mentioned shortcoming can, as explained in French Pat. No. 1,593,389, be overcome by adopting as a light measuring element, a CdS photo cell which is connected in series with a logarithmic compression diode which compresses the information of the brightness of the object. This is done by compressing the output of the light receiving element that the information of the brightness of the object can easily be processed electrically. However, the logarithmic compression of the diode is obtained from only a part of the range in the forward direction in such a manner that the range of logarithmic compression is so small that it is difficult to carry out an exact logarithmic compression of the brightness of the object. Thus, the logarithmically compressed value itself is not correct and when the logarithmically compressed value is amplified to obtain a final exposure value, the error is also amplified. Accordingly, the exact processing of the information of the brightness of the object cannot be performed.

Further, when a camera such as a single reflex camera in which the light beam coming through the photographing lens is measured so as to determine the exposure time, the light receiving element for measuring the light beam of the object projects its shadow on the image forming plane of the film during photographing. Accordingly, it is necessary to design the camera in such a manner that the brightness of the object to be photographed is stored in some form and, based upon the stored value, the exposure time of the camera is adjusted. As the means which has so far been proposed for this type of camera, an electrical shutter circuit which, as explained in the Japanese Pat. Nos. Sho 40-27871 as well as Sho 44-18672, charges the electrical output of the light receiving element into the storage condenser before taking a photograph in such a manner that based upon the stored value, the exposure time during photography is adjusted.

The electrical shutter circuit disclosed in the latter patent publication is, similar to the above mentioned French patent, so designed that the output of the light receiving element is logarithmically compressed by means of a logarithmic diode and stored in a condenser as the information of the brightness of the object so as to adjust the exposure time in correct response to the brightness of the object varying over wide range.

Generally speaking, the brightness of an object to be photographed is varied in such a manner that the photographable upper limit is several ten thousand times as much as the photographable lower limit. Accordingly, when the brightness with such variation is directly supplied to a storage means such as condenser, the condenser is not charged in accordance with the variations, being accompanied with a remarkable error for the exposure time. Therefore it is in practice difficult to adjust a correct exposure time unless, as is disclosed in the above mentioned patent publication, by means of a compression element such as a logarithmic diode, the information of the brightness of the object to be photographed should be compressed and, based upon this compressed stored value, the exposure time is adjusted.

However, the element presenting a logarithmic compression characteristics such as a logarithmic diode by means of which the information of the brightness of the object to be photographed is compressed logarithmically has, in general, a comparatively narrow range of logarithmic, compression capability. Accordingly, it is difficult for the element to present an exact output with compression characteristics for the variation of the information of the brightness of the object to be photographed, namely, the output of the light receiving element over a wide range.

A purpose of the present invention is to offer a light measuring system capable of a high precision light measurement of an object with brightness over a wide range, overcoming the above mentioned shortcoming.

Another purpose of the present invention is to offer an electrical shutter circuit for a storage system capable of exact exposure time adjustment without using a circuit means presenting logarithmic compression characteristics, overcoming the above mentioned shortcoming. According to the present invention, the first means for receiving at least a part of the light beam coming from a part, for example, in the neighborhood of the outer part of the object to be photgraphed, the second means for receiving at least a part of the light beam coming from a part than the neighborhood of the outer other part of the object to be photographed and the means for forming the difference between the output of the first light receiving means and that of the second light receiving means are provided in such a manner that the desired information of the brightness of a part of the object to be photographed is obtained by means of the above mentioned difference between the outputs and the separately provided third light receiving means.

Figure 3:
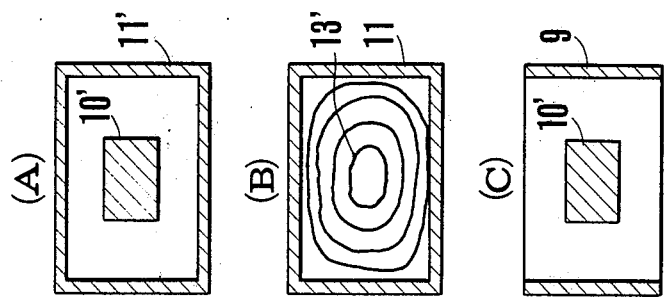
Figure 2:
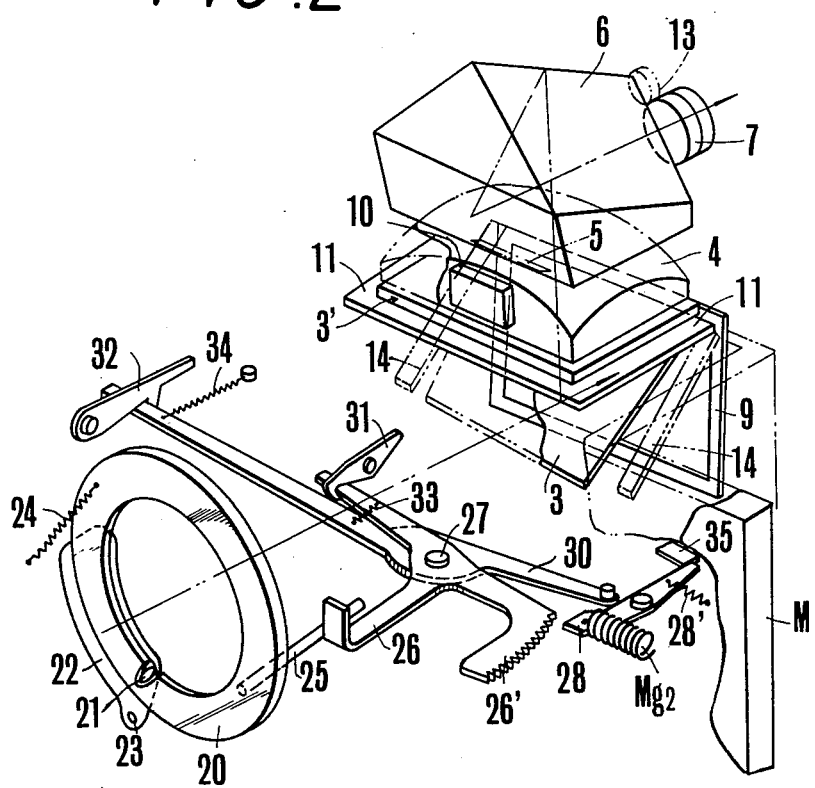
Figure 4:
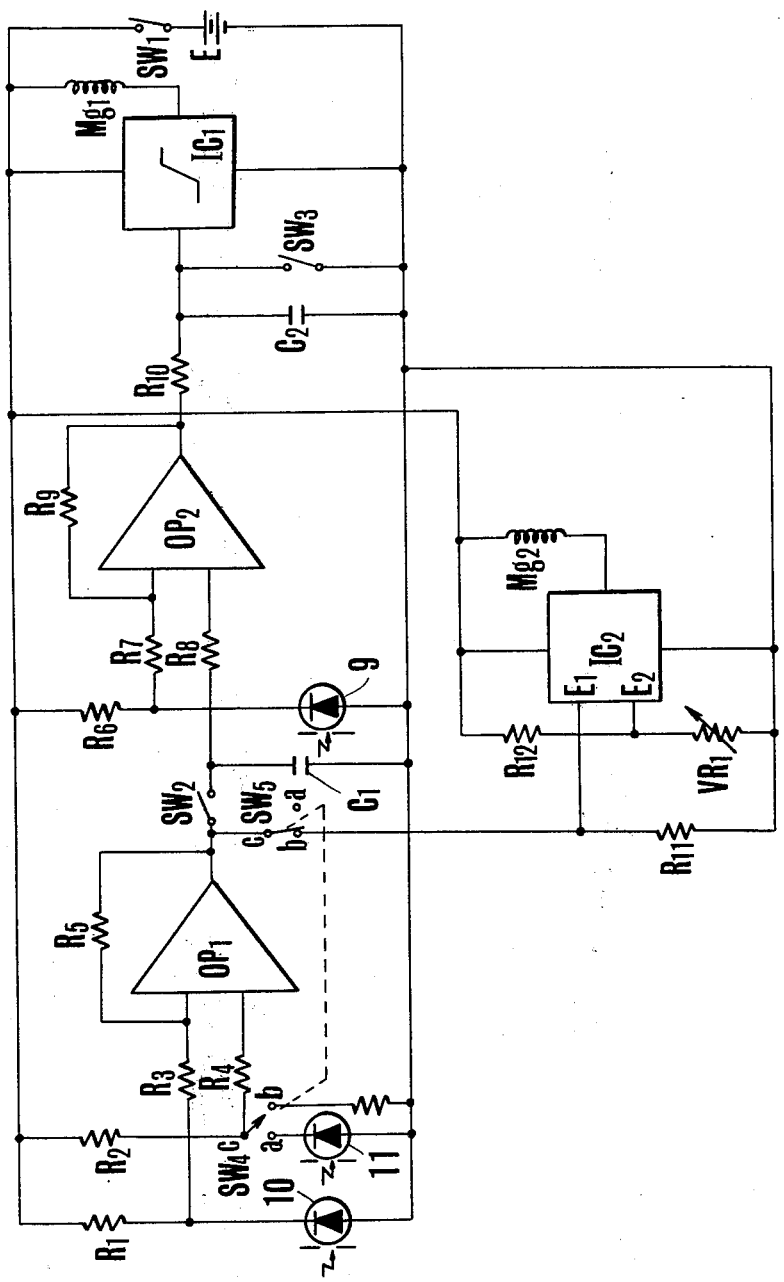

Below, the present invention will be explained in detail according to the attached drawings of the embodiments of the present invention, in which;

FIG. 1 shows a camera in section to which the light measuring system according to the present invention is applied, FIG. 2 shows important parts composing the camera shown in FIG. 1, FIG. 3(A), (3(B) and 3(C) show respectively a diagram of the light measuring sensitivity of the light measuring elements to be applied to the camera shown in FIG. 1, and FIG. 4 shows an electrical circuit to be applied to the camera shown in FIG. 1.

FIG. 1 and FIG. 2 show an embodiment in which the light measuring system according to the present invention is applied to a single reflex camera with TTL light measuring system, whereby 1 shows an image frame, 2 a focal plane shutter, 3 a quick return mirror, 4 a condenser for view finder, 5 a semipermeable mirror obliquely provided at the central part of the condenser, 6 a pentagonal prism and 7 an eye piece.

1–7 are the already known parts of camera so that their explanations are omitted here.

8 is a plate provided in front of the image frame 1 and presenting an opening almost equal to the image frame 1. 9 is a photo voltaic cell provided around the plate 8, 10 is a photoconductive cell provided at the end face of the condenser lens 4 so as to be opposed to the semipermeable mirror 5, 11 a photo voltaic cell provided around the lower face of the condenser lens and presenting a light receiving surface almost equal to that of the photo voltaic cell 9, 12 and 13 respectively are light receiving elements to be provided instead of the photo voltaic cell 10 and disposed in such a position in which the light beam coming from only the central part of the object to be photographed is measured. The light beam coming from the object to be photographed through the photographic lens is reflected before photographing by means of the mirror 3 whereby the light beam coming from the part around the object to be photographed is received by the cell 11. At the same time, the light beam coming from the central part of the object is reflected by means of the semipermeable mirror part 5 of the condenser lens 4 and entered into the cell 10. As a result, the light measuring sensitivity of the cell 10 and that of the cell 11 are as shown in FIG. 3(A), whereby the light sensitive part 10' by means of the cell 10 and the response part 11' by means of the cell 11 are distributed with reference to the image of the object to be photographed. The light sensitive part by means of the cell 11 presents the light measuring sensitivity in a part other than the effective image plane, namely in the part a little outside of the image frame 1 of the film. If the light beam coming from the object to be photographed is evenly distributed, the ratio of the output of the cell 11 to that of the cell 10 becomes constant. Further, when more parts with higher brightness exist near the central part of the image plane than around the image plane, the output of the cell 10 in charge of the central part becomes larger than that of the cell 11.

In case the cell 13 is used instead of the cell 10, the light measuring sensitivity of the cell 11 and that of the cell 13 are distributed as is shown in FIG. 3(B), whereby the cell presents a response range which is most sensitive at the central part of the image of the object to be photographed and has lesser sensitivity the further it is from the central part.

FIG. 4 shows a circuit of the electrical shutter to be applied to the camera shown in FIGS. 1 and 2, in which $R_1$ - $R_2$ are circuit resistances, $Sw_1$ is the main switch, $Sw_2$ is the storage switch which opens with the upward movement of the mirror 3 and closes with the downward movement thereof, $Sw_3$ is a short circuit switch which opens with the movement of the shutter 2, $Sw_4$ and $Sw_5$ make a coupled switch which is functionally engaged with the starting member of the mirror 3 engaged with a shutter release button (not shown). This occurs in such a manner that immediately before the upward movement of the mirror 3 the movable contact is connected with the contact as shown in FIG. 4 by means of the pressure at the time of the shutter release and, after the return of the mirror 3, is kept in contact with the contact $b$, $c_1$ is a storage condenser, $c_2$ is a timer condenser, $OP_1$ and $OP_2$ are operation amplifier circuits, $IC_1$ is a switching circuit, $IC_2$ is a level comparison circuit, $Mg_1$ is a magnet for closing the rear shutter plane and $Mg_2$ is a magnet for adjusting the diaphragm opening to be explained later.

The magnet for adjusting the diaphragm opening $Mg_2$ is shown in FIG. 2. In FIG. 2, M is the mirror box, 20 is the ring for driving the diaphragm blades 22 of the diaphragm device at the side of the photographing lens whereby, as is shown in the drawing with reference to the blade 22, long holes are formed along the internal edge of the ring 20 in such a manner that the pin 21 of the blade 22 is engaged in the above mentioned hole. 23 is the pin pivoting the diaphragm blade 22 rotatably. 24 is the returning spring engaged with the ring 20, 25 the lever pin projecting toward the side of the camera body so as to drive the diaphragm and 26 the automatic diaphragm lever pivoted at 27 on the fixed frame at the side of the camera, engaging with the pin 25 with its curved end and shaped in form of fork, whereby the other part is shaped in form of saw tooth 26'. 28 is the diaphragm adjusting lever engaged with the spring 28' and rotatable anticlockwise by means of the magnet $Mg_2$ against the force of the spring 28' 30 is the charging lever pivoted rotatably on the shaft 27; 31 the fixing lever in functional engagement with the shutter release mechanism not shown in the drawing; 32 the discharging lever in functional engagement of the rear shutter plane so as to discharge the fixation of the rear shutter plane; 33 and 34 are the returning springs and 25 is the lever in functional engagement with the one end of the lever 28 so as to actuate the mirror 3.

When the camera with the above mentioned construction is directed toward the object to be photographed and the main switch is closed the outputs of the amplifier circuit $OP_1$ are varied corresponding to the quantity of light incident on the cell 10. Even if the shutter is then released, the switches $Sw_4$ and $Sw_5$ remain in a state in which their movable contacts are connected with the contact $b$ while the fixing lever 31 is released. As a result, the lever 26 is rotated clockwise by means of the spring 33, rotating the ring 20 clockwise by means of the pin 25 in such a manner that the diaphragm blades are gradually closed. Because the variable resistance $VR_1$ is set in accordance with the informations for exposure such as the desired exposure time, the sensibility of the film to be used and so on in advance before the shutter release, their set informations are compared with the output of the amplifier circuit $OP_1$ in the level comparison circuit $IC_2$. Because the diaphragm of the photographing lens is gradually made small, the outputs of the cells 10 become also smaller and smaller until the both levels of the inputs into the comparison circuit $IC_2$ are equal to each other, when the magnet $Mg_2$ is not excited any more, so that the lever 28 is rotated clockwise by means of the spring 28' so as to engage with the saw tooth shaped part of the lever 26 in such a manner that the diaphragm blades are set to a certain determined opening. The switches $Sw_4$, $Sw_5$ are changed over to the side of contact with the help of the starting motion of the lever 28; the outputs of the cells 10 and 11 are added to the inputs of the amplifier circuit $OP_1$ in such a manner that the difference between the outputs ($V_{10}$-$V_{11}$) is led into the storage condenser by means of the switch $Sw_2$.

Thus, even if the brightness of the object to be photographed varies in a wide range the difference between the outputs of the cells is not so large namely several hundred times as much at largest so that it is possible for the storage condenser to be charged with the difference between the outputs precisely. Further, by means of the actuation of the lever 28 in functional engagement with the lever 35, the mirror 3 is started to move upwards, with the upward movement of the mirror 3, the switch $Sw_2$ becomes "OFF" and the memory of the storage condenser $C_1$ is maintained. Then the shutter 2 starts to run and the short circuit switch $Sw_3$ is opened.

As a result of the upward movement of the mirror, the light beam coming through the opening of the diaphragm set as above mentioned from the part around the object to be photographed enters into the cell 9 whose output voltage is added to the input of the operation circuit $OP_2$ together with the terminal voltage of the strage condenser $c_1$ in such a manner that the condenser $c_2$ is started to be charged. In the operation circuit $OP_2$ the difference between the charging voltage $(V_{11}-V_{10})$ for the storage condenser $c_1$ connected with the input of the operation circuit $OP_2$ and the output voltage $(V_9)$ of the cell 9 is processed. Namely, at the output terminal of the operation circuit $OP_2$, a voltage $V_9-(V_{11}-V_{10}) = V_{10} -(V_9-V_{11})$ appears. $(V_9-V_{11})$ is almost zero because $V_9$ and $V_{11}$ are the values for the light beams coming from almost the same part of the object to be photographed so that the output voltage of the operation circuit $OP_2$ corresponds with the output of the cell 10. Thus, on the output of the operation amplifier circuit $OP_2$ appears the terminal voltage of the storage condenser $c_1$ calibrated by the light beam coming from the part around the object to be photographed, namely the output voltage almost proportional to the brightness of the central part of the object to be photographed and after a certain determined time, the switching circuit $IC_1$ is reversed by means of the terminal voltage of the condenser $c_2$ in such a manner that the magnet $Mg_1$ is excited and the rear shutter plane is closed. The shutter mechanism as well as the magnet $Mg_1$ for holding the rear shutter plane are those well known for the electrical shutter of the focal plane type and therefore omitted in the drawing.

As a result, the exposure time set by the variable resistance $VR_1$ in advance is in practice calibrated and adjusted by means of the output of the storage condenser $c_1$ and the cell 9 into the adjusted proper exposure time.

Further instead of the cell 9 in the above mentioned embodiment, a mirror 14 obliquely fixed as is shown in FIG. 2 can be provided in such a manner that the light beam reflected by the mirror 14 enters into the cell 11 and the characteristics of the light measuring sensitivity then is shown in FIG. 3(B). Different from the cell provided outside of the image frame, the cell receiving the light beam coming from the part around the object to be photographed as in case of the above mentioned embodiment can be designed so as to project into a part of the image plane. Further, in case there is no space for providing the cell in the surface of the mirror box M, it is also possible to do without the cell part in the lower part of the image plane in order to prevent influence of the sky light.

Further, when the light receiving element is small, it is possible to condense the light beam by putting thin laminate prism light guides one over another.

Although in the above mentioned embodiment the shutter of automatic diaphragm type is used, it goes without saying that the system according to the present invention can also be applied to the camera in which the diaphragm is manually adjusted by means of the preset diaphragm ring. Further, the above mentioned embodiment relates to the case of the camera with TTL light measuring system, while the system according to the present invention can also be applied to the camera with independent light measuring system. In this case, it is natural that each light receiving element should need the member for limiting the light receiving angle so as to receive only the light beam coming from the determined part of the project to be photographed and could do without the storage condenser.

As explained so far, it is possible to carry out the light measurement of the object to be photographed with brightness over a wide range by making use of the difference between the brightness of two parts, namely, the brightness at the central part and that around the object to be photographed, whereby according to the necessity by storing the difference of the brightness in the storage condenser it is possible to obtain a proper exposure with reference to the brightness of the object to be photographed over a wide range as the light measuring system of the camera, thus overcoming the shortcoming of the conventional circuit presenting compression characteristics.

What is claimed is:

1. A camera shutter control device comprising:
   a light intensity-to-electric signal conversion means, said means including a first, second and third photosensitive means, respectively, said first and second photosensitive means for sensing the light flux coming from different parts of a scene object, said second and third photosensitive means for sensing the light flux coming from substantially one and the same part of a scene object, each of the first, second and third photosensitive means for providing electrical output signals corresponding to the quantity of light incident thereupon, respectively;
   a memory means, said means being electrically coupled and responsive to said first and said second photosensitive means for memorizing the difference in signal outputs between the first and the second photosensitive means;
   an operation means, said means being coupled at an input terminal thereof and responsive to said memory means and said third photosensitive means respectively for obtaining the difference in the outputs between said memory means and third photosensitive means as an operation means output; and
   a control means, said means being coupled to said operation means for controlling the time for opening the shutter in accordance with the output of said operation means.

2. The device according to claim 1, wherein said memory means includes an operation amplifier having an input connected with said first and second photosensitive means and wherein the memory condenser is connected to the output of said operation amplifier.

3. The device according to claim 1, wherein said first photosensitive means includes a light receiving surface at the position at which said surface receives the light beam at the central part of the image of the object to be photographed and wherein said second and third photosensitive means each include a light receiving surface at the position at which the surfaces receive the light beam at a part surrounding the image of the object to be photographed.

4. The device according to claim 1, wherein said second and third photosensitive means are photo voltaic cells.

5. An exposure control arrangement in a camera having an objective lens and a shutter movable between a closed and open position comprising:
- a first photosensitive means positioned behind said objective lens, said device receiving a part of the light beam coming from the image of the object to be photographed for converting the received light beam into an electrical signal;
- a second photosensitive means positioned behind said objective lens, said device receiving a light beam coming from a part of the image of the object to be photographed other than the part from which said first photosensitive device receives a light beam for converting the received light beam into an electrical signal;
- an operation circuit means, said means being coupled and responsive to both of said photosensitive means for operating on their respective signals and providing the difference as an output signal;
- a memory means, said means being coupled and responsive to said operation circuit means for electrically storing the output signal of said operation circuit means;
- a control means, said means including a third photosensitive means for receiving a light beam of substantially the same portion of the object image as the second photosensitive means for converting the received light beam into an electrical signal, said control means being electrically coupled and responsive to said memory means and said third means for providing an output signal corresponding to the difference between them; and
- a timing means coupled to said control means to control the open time of said shutter in accordance with the electrical output signal from said control means.

6. The exposure control arrangement according to claim 5, wherein behind said shutter, a film having a photosensitive recording surface is provided and said third photosensitive means receives at least a part of the light beam falling on the film for converting the light beam into an electrical signal when said shutter is opened.

7. The exposure control arrangement according to claim 5, wherein said first photosensitive means is provided at a position at which said first photosensitive means receives the light beam coming from approximately the central part of the object to be photographed, and said second photosensitive means is provided at the position at which said second means receives the light beam coming from a part of the image surrounding the object to be photographed.

8. The exposure control arrangement according to claim 5, wherein said third photosensitive means is provided at least at a part surrounding the photographing frame of the film.

9. The exposure control arrangement according to claim 5, wherein said first and second photosensitive means are provided inside said camera at a position at which the light beam coming from the object to be photographed is interrupted during exposure.

10. The exposure control arrangement according to claim 5, wherein said memory means is a capacitor which is charged up to the output voltage of said operation means.

11. The exposure control arrangement according to claim 5, wherein said photosensitive means is of the photovoltaic type.

12. A camera provided with an automatic exposure control system, a system measuring light through a photographic taking lens and a diaphragm device comprising:
- a. a light measuring device comprising a first and a second photosensitive means, said both means provided behind said lens for respectively receiving the light beam coming from different parts of an object to be photographed and for converting the light beam received into electrical output signals;
- means being electrically coupled and responsive to said both photosensitive means, for providing the difference between their respective electrical output signals;
- a shutter speed setting means, said setting means including a variable resistance, said resistance having a value corresponding to the set shutter speed;
- means responsive to said difference-providing means and said shutter speed setting means for comparing the signals, out of said difference-providing means and shutter speed setting means with each other and for determining the opening of said diaphragm, said comparing and determining means also including an electromagnetic element and being engageable with said diaphragm device;
- a memory condenser, said condenser being electrically coupled to said difference-providing means for storing its output;
- a shutter control device, said device including a third photosensitive means, for receiving substantially the same light beam coming from the object to be photographed as said second photosensitive means, and also including an operation circuit having an input coupled to said third photosensitive means and said condenser for forming the difference between their outputs and a timing means for setting the open time of the shutter in accordance with the difference output.

13. An exposure control device comprising:
- a light intensity-to-electric signal conversion means, said means having a first photosensitive means and a second photosensitive means, each of said two means sensitive to the light flux coming from substantially different parts of a scene object for providing electrical signals corresponding to the quantity of light incident thereupon respectively;
- an operation means, said means being coupled at the input terminal thereof with the first and the second photosensitive means respectively and being provided at the output terminal thereof with a comparison circuit for providing an output in accordance with the difference in the output signals between said two photosensitive means as well as with a memory means for memorizing the output of said comparison circuit;
- a third photosensitive means, said means sensing essentially the same light flux from a scene object as said second photosensitive means;
- a control means, said means being coupled at the input terminal thereof with said operation means and said third photosensitive means for providing an output corresponding to the output of said first photosensitive means by applying the output of said photosensitive means to the output of said operation means;

so that the light beam from the determined part of the object to be photographed is measured by means of the first photosensitive means and the output is obtained by said control means.

14. The exposure control device according to claim 13, wherein said control means includes a comparison circuit with a first and the second comparison input whereby the first comparison input is connected with the memory means while the second comparison input is connected with the third photosensitive means in such a manner that the comparison circuit forms the difference between the signal given to the first comparison input and that given to the second comparison input.

15. The exposure control device according to claim 13, wherein said memory means includes a storage condenser to store the result of operation.

16. The exposure control device according to claim 13, wherein a timing means is further provided, being connected with said control means so that said timing means controls the open time of the shutter in accordance with the output of said control means.

17. The exposure control device according to claim 16, wherein said control device includes a comparison circuit and a first and second comparison input, wherein the first comparison input is connected with the operation means and the second comparison input is connected with the third photosensitive means so that the comparison circuit forms the difference between the signal supplied to the second comparison input.

18. The exposure control device according to claim 17, wherein said operation means and said control means respectively include an operation amplifier circuit.

19. The exposure control device according to claim 17, wherein said operation means includes a storage condenser for storing the result of the difference operation.

* * * * *